US009873120B2

(12) United States Patent
Wright

(10) Patent No.: US 9,873,120 B2
(45) Date of Patent: Jan. 23, 2018

(54) MODULE WITH COLLAPSIBLE FLUID CHAMBER AND ONBOARD FLUID CHAMBER COMPRESSION ELEMENT

(71) Applicant: GENMARK DIAGNOSTICS, INC., Carlsbad, CA (US)

(72) Inventor: David Walter Wright, Littleton, CO (US)

(73) Assignee: GenMark Diagnositics, Inc., Carlsbad, CA (US)

(*) Notice: Subject to any disclaimer, the term of this patent is extended or adjusted under 35 U.S.C. 154(b) by 165 days.

(21) Appl. No.: 15/026,314

(22) PCT Filed: Sep. 30, 2014

(86) PCT No.: PCT/US2014/058322

§ 371 (c)(1),
(2) Date: Mar. 31, 2016

(87) PCT Pub. No.: WO2015/050872

PCT Pub. Date: Apr. 9, 2015

(65) Prior Publication Data

US 2016/0236191 A1 Aug. 18, 2016

Related U.S. Application Data

(60) Provisional application No. 61/885,083, filed on Oct. 1, 2013.

(51) Int. Cl.

*G01N 21/75* (2006.01)
*B01L 3/00* (2006.01)
*B65D 81/32* (2006.01)

(52) U.S. Cl.

CPC ............... *B01L 3/505* (2013.01); *B01L 3/502* (2013.01); *B01L 3/52* (2013.01); *B65D 81/3238* (2013.01);

(Continued)

(58) Field of Classification Search

CPC .. B01L 3/505; B01L 3/52; B01L 3/502; B01L 2300/12; B01L 2300/126;

(Continued)

(56) References Cited

U.S. PATENT DOCUMENTS

| | | | |
|---|---|---|---|
| 2008/0038164 | A1 | 2/2008 | Satou et al. |
| 2011/0113901 | A1 | 5/2011 | Gonzalez |
| 2011/0270220 | A1 | 11/2011 | Genosar |

FOREIGN PATENT DOCUMENTS

WO WO 2012064761 A2 5/2012

OTHER PUBLICATIONS

International Search Report issued in International Patent Application No. PCT/US2014/058322, 4 pages (Jan. 19, 2015).

(Continued)

*Primary Examiner* — Dennis White
(74) *Attorney, Agent, or Firm* — Rothwell, Figg, Ernst & Manbeck, P.C.

(57) ABSTRACT

A module for processing fluids includes one or more collapsible fluid chambers supported on a substrate, a compression element supported on the substrate and configured to be movable with respect to the one or more chambers, and an actuating element coupled to the compression element and configured to effect movement of the compression element relative to the one or more fluid chambers to collapse each fluid chamber by compressing the fluid chamber between the compression element and the substrate as the compression element moves over the fluid chamber. A method for motivating a fluid out of a fluid chamber comprises the steps of providing a module that includes one or more collapsible fluid chambers supported on a substrate, a compression element supported on the substrate and configured to be movable with respect to the one or more chambers, and an actuating element coupled to the compression element and configured to effect movement of the compression element (Continued)

relative to the one or more fluid chambers and moving the actuator element to move the compression element across at least a portion of t substrate and compress the fluid chamber, thereby motivating the fluid out of the fluid chamber.

33 Claims, 5 Drawing Sheets

(52) U.S. Cl.
CPC . *B01L 2200/0621* (2013.01); *B01L 2300/087* (2013.01); *B01L 2300/0816* (2013.01); *B01L 2300/12* (2013.01); *B01L 2300/123* (2013.01); *B01L 2300/126* (2013.01); *B01L 2400/0481* (2013.01)

(58) Field of Classification Search
CPC ......... B01L 2300/123; B01L 2300/087; B01L 2300/0816; B01L 2200/0621; B01L 2400/0481; B65D 81/3238
See application file for complete search history.

(56) References Cited

OTHER PUBLICATIONS

Written Opinion issued in International Patent Application No. PCT/US2014/058322, 5 pages dated Jan. 19, 2015).
International Preliminary Report on Patentability issued in International Patent Application No. PCT/US2014/058322, 18 pages dated Sep. 9, 2015).

MODULE WITH COLLAPSIBLE FLUID CHAMBER AND ONBOARD FLUID CHAMBER COMPRESSION ELEMENT

CROSS-REFERENCE TO RELATED APPLICATION

This application is a 35 U.S.C. 371 National Phase Entry Application from PCT/US2014/058322, filed Sep. 30, 2014, which claims the benefit under 35 U.S.C. § 119(e) of the filing date of provisional patent application Ser. No. 61/885,083 filed Oct. 1, 2013, the respective disclosure(s) which is(are) incorporated herein by reference.

FIELD OF THE INVENTION

Aspects of the invention relate to methods and apparatus for compressing a collapsible fluid chamber of a fluid processing module. One aspect of the invention relates to generating compressive forces using an on-board compression element that is movable with respect to one or more fluid chambers in a manner that enables actuation of the compression element in a low profile instrument.

BACKGROUND OF INVENTION

The present invention relates to systems, methods, and apparatus for manipulating deformable fluid chambers of a fluid processing module. A fluid processing module of the type in which aspects of the present invention may be implemented includes one or more collapsible (deformable) fluid chambers (blisters) supported on a substrate or other suitable structure. The fluid chambers may contain one or more materials used in a process that requires fluid manipulation, such as a chemical or biochemical process, including sample material, reagents (e.g., lysing, target capture, amplification, detection, elution, etc. reagents), buffer solutions, oil, etc. One or more fluid channels may interconnect two or more chambers or may connect a fluid chamber exteriorly of the module, e.g., via a fluid inlet or outlet port. One or more fluid chambers may initially be partially or fully empty so as to have capacity to receive fluids from another chamber or from an external source.

Such a fluid processing module may be processed by selectively compressing one or more of the fluid chambers to completely or partially collapse the chamber to displace the fluid therefrom. Instruments adapted to process the fluid processing module, or other devices with deformable fluid chambers, include mechanical actuators, e.g., pneumatically or electromechanically actuated, constructed and arranged to apply collapsing pressure to the chamber(s). Typically, such actuator(s) is(are) disposed and are moved transversely to the plane of the fluid processing module—for example, if the module were oriented horizontally within an instrument—actuators may be provided vertically above and/or below the module and would be actuated to move vertically, in a direction generally transverse to the plane of the module. Alternatively, the instrument may include one or more roller elements and associated roller-driving mechanisms configured to roll the roller element across the module to thereby collapse any chamber(s) over which the roller element rolls.

The fluid processing module may be processed in an instrument in which the module is placed into a slot or other low profile chamber for processing. In such a slot, or low profile chamber, providing actuators, rollers, or other devices, including associated driving mechanisms, that are oriented vertically above and/or below the module and/or move in a vertical direction may not be practical. The pneumatic and/or electromechanical devices for effecting movement of such actuators require space above and/or below the module's substrate—space that may not be available in a slotted or other low profile instrument—and add complexity to the module-processing instrument.

Accordingly, a need exists for methods and/or apparatus for effecting compression of a fluid chamber within a low profile component space of an instrument.

SUMMARY OF THE INVENTION

Aspects of the invention are embodied in a module comprising a substrate, a collapsible fluid chamber supported on said substrate, a compression element, and an actuator element. The compression element is configured to collapse the fluid chamber by compressing the fluid chamber between the compression element and the substrate as said compression element moves across at least a portion of said substrate. The actuator element is constructed and arranged for movement in a plane that is substantially parallel to a plane of the substrate and is coupled to the compression element such that movement of said actuator element in a plane that is substantially parallel to a plane of the substrate causes corresponding movement of the compression element across the substrate to compress the fluid chamber.

According to further aspects, the actuator element comprises an actuator strip including a free end and a portion coupled to the compression element.

According to further aspects, the actuator element further includes a fixed end secured to the substrate and a middle portion extending from the fixed end to the free end and engaging the compression element.

According to further aspects, the middle portion of the actuator strip extends around the compression element.

According to further aspects, the portion of the actuator strip coupled to the compression element comprises a segment of the actuator strip wrapped around the compression element and secured to a portion of the actuator strip.

According to further aspects, the actuator strip is configured such that a first portion of the strip extending between the fixed end and the compression element is parallel to a second portion of the strip extending between the compression element and the free end.

According to further aspects, the actuator strip is formed from a low friction material selected from the group consisting of Mylar paper, nylon, and aluminized plastic sheet.

According to further aspects, the actuator element comprises a yoke configured for coupling the compression element to the actuator element.

According to further aspects, the compression element comprises a roller which may be a cylinder or a convex regular polygon.

According to further aspects, the module further comprises a gear formed on the roller and a gear rack formed on the substrate in position for operative engagement by the gear formed on the roller.

According to further aspects, the actuator element comprises an engagement member configured to engage an external pulling means.

According to further aspects, the engagement member includes an opening formed through the actuator element.

According to further aspects, the compression element comprises a roller, and the roller is disposed within a recess formed in the substrate, the recess having a width substantially corresponding to an axial length of the roller.

According to further aspects, the compression element comprises a roller, and the roller is disposed within a recess formed in the substrate, the recess having a depth substantially corresponding to a width of the roller.

According to further aspects, the module further comprises a cover element secured to the substrate and covering the recess and the compression element.

According to further aspects, the module comprises a plurality of collapsible fluid chambers.

According to further aspects, at least two of the fluid chambers are interconnected by a fluid channel.

According to further aspects, the module comprises a plurality of collapsible fluid chambers arranged such that the compression element sequentially compresses each of the chambers as the compression element moves across at least a portion of the substrate.

According to further aspects, the module further comprises one or more fluid transmission channels connected to each collapsible fluid chamber and configured to transmit a fluid forced from the fluid chamber when the fluid chamber is collapsed.

According to further aspects, the module comprises a plurality of compression elements configured to collapse a plurality of fluid chambers by compressing the fluid chambers between the compression elements and the substrate as the compression elements move across at least a portion of the substrate.

According to further aspects, the module comprises at least one actuator element associated with each compression element.

According to further aspects, the module comprises a plurality of actuator elements, each actuator element comprising a fixed end secured to the substrate, a free end, and a middle portion extending from the fixed end to the free end and engaging one or more of the compression elements, such that pulling the free end of each actuator strip causes one or more of the compression elements to move across at least a portion of the substrate and compress one or more of the fluid chambers.

According to further aspects, at least two of the compression elements are actuated by a single actuator element.

Aspects of the invention are embodied in a method of motivating a fluid out of a fluid chamber. The method comprises the steps of providing a module including at least one collapsible fluid chamber supported on a substrate, a compression element, and an actuator element constructed and arranged for movement in a plane that is substantially parallel to a plane of the substrate and coupled to the compression element such that movement of the actuator element in a plane that is substantially parallel to a plane of the substrate causes corresponding movement of the compression element across the substrate to compress the fluid chamber. The actuator element is moved in a plane that is substantially parallel to a plane of the substrate to move the compression element across at least a portion of the substrate and compress the fluid chamber, thereby motivating the fluid out of the fluid chamber.

According to further aspects, the method comprises the step of moving the compression element sequentially over each of a plurality of collapsible fluid chambers supported on the substrate.

According to further aspects of the method, the compression element comprises a roller, and the roller may comprise a cylinder or a convex regular polygon.

According to further aspects of the method, the actuator element comprises an actuator strip having a free end and a portion coupled to the compression element.

According to further aspects of the method, the actuator strip further includes a fixed end secured to the substrate and a middle portion extending from the fixed end to the free end and engaging the compression element.

According to further aspects of the method, the middle portion of the actuator strip extends around the compression element.

According to further aspects of the method, moving the actuator element comprises compressing, sequentially or in parallel, a plurality of collapsible fluid chambers as the compression element moves across at least a portion of the substrate.

According to further aspects of the method, moving the actuator element comprises compressing, sequentially or in parallel, a plurality of collapsible fluid chambers by a plurality of compression elements as the compression elements move across at least a portion of the substrate.

According to further aspects of the method, moving the actuator element comprises pulling, sequentially or in parallel, a plurality of actuator elements, each comprising an actuator strip including a fixed end secured to the substrate, a free end, and a middle portion extending from the fixed end to the free end and engaging one or more of the compression elements, such that pulling the free end of each actuator strip causes one or more of the compression elements to move across at least a portion of the substrate and compress one or more of the fluid chambers.

According to further aspects of the method, two or more of the compression elements are actuated by a single actuator strip.

According to further aspects, the method further comprises, prior to moving the actuator element, a step of engaging the actuator element(s) to an external pulling means via an engagement member of the actuator element.

According to further aspects of the method, each actuator element comprises an actuator strip and the engagement member includes an opening formed through the actuator strip(s).

Other features and characteristics of the present invention, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various, non-limiting embodiments of the present invention. In the drawings, common reference numbers indicate identical or functionally similar elements.

DETAILED DESCRIPTION OF THE INVENTION

Figure 1:
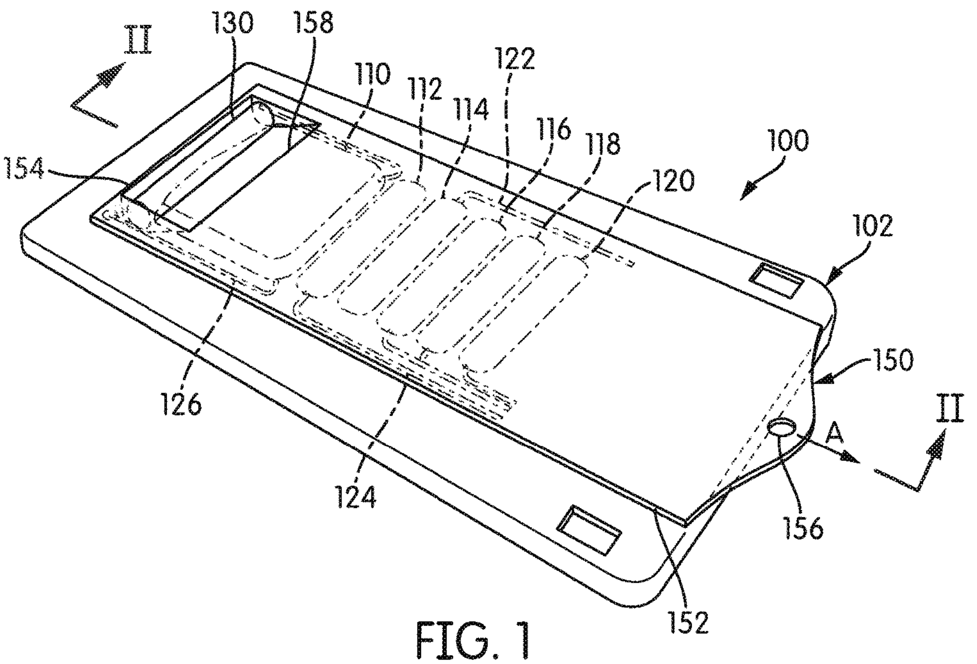
FIG. 1 is perspective view of a module for processing fluids and including an onboard fluid chamber compression element embodying aspects of the present invention.

Unless defined otherwise, all terms of art, notations and other scientific terms or terminology used herein have the same meaning as is commonly understood by one of ordinary skill in the art to which this disclosure belongs. Many of the techniques and procedures described or referenced herein are well understood and commonly employed using conventional methodology by those skilled in the art. As appropriate, procedures involving the use of commercially available kits and reagents are generally carried out in accordance with manufacturer defined protocols and/or parameters unless otherwise noted. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, “a” or “an” means “at least one” or “one or more.”

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting.

Figure 2:
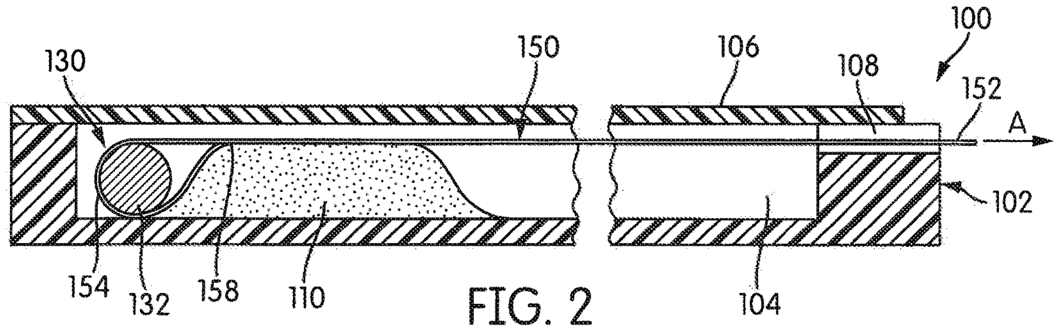
FIG. 2 is a transverse cross-section of the module shown in FIG. 1 along the line II-II.

A module for processing a fluid and including collapsible fluid chambers and an onboard fluid chamber compression element embodying aspects of the present invention is represented by reference number 100 in FIGS. 1 and 2. FIG. 1 is a perspective view of the module 100, and FIG. 2 is a transverse cross-section of the module 100 along the line II-II in FIG. 1. The module 100 includes a substrate 102 on which are supported a plurality of fluid chambers 110, 112, 114, 116, 118, 120, one or more of which are constructed and arranged so as to be at least partially collapsible by application of an compressive force to an external surface of the chamber. Each chamber may be formed from a flexible sheet material sealed or otherwise secured around a peripheral edge thereof to the substrate 102. Although the module 100 is shown having six fluid chambers 110-120, it should be understood that the module may have fewer or more than six fluid chambers. The module 100 may also include one or more fluid transmission channels, or conduits—indicated by reference numbers 122, 124, 126 in FIG. 1—for interconnecting two or more of the fluid chambers 110-120 to each other and/or for connecting one or more of the fluid chambers to other fluid processing components of the module 100, such as inlet or outlet ports.

Module 100 further includes an onboard compression element 130 carried on the substrate 102 and constructed and arranged to be movable over the substrate 102 with respect to one or more of the fluid chambers 110-120 and to collapse (burst) a fluid chamber by compressing the fluid chamber between the compression element 130 and the substrate 102 as the compression element 130 moves across at least a portion of the substrate on which the fluid chamber is supported. In the illustrated embodiment, movement of the onboard compression element 130 across the substrate 102 may sequentially burst the fluid chambers 110-120 to sequentially advance the contents of the respective compartments to subsequent compartments.

An actuator element 150 is disposed across the substrate 102. In the illustrated embodiment, the actuator element comprises an actuator strip 150, which includes a first portion 152, which is a free end portion, and a second portion 154 that is coupled to the compression element 130. In the context of this disclosure, “coupled”—or couple, couples, coupling, etc.—means a cooperative association between two or more components or portions thereof, which may or may not include a physical connection or contact between the components (e.g., a magnetic coupling), whereby a force moving one of the components is transmitted via the coupling to the operatively associated component, thereby applying a moving force to the associated component.

The actuator strip 150 is configured to be movable relative to the substrate 102 and to thereby cause a corresponding movement of the compression element 130 to which the actuator strip 150 is coupled. In the illustrated embodiment, the substrate 102 has a flat planar shape, and the actuator strip 150 preferably moves across the substrate in a direction and orientation that is substantially parallel to the plane of the substrate 102. Thus, the actuator strip 150 is in close proximity to the substrate 102 and occupies little space outside (e.g., vertically above) the substrate 102 and thus provides a low profile mechanism for effecting movement of the compression element 130. The actuator strip 150 may include an engagement feature 156 proximate the first portion 152. Engagement feature 156, which, in the illustrated embodiment, comprises a hole formed through the first portion 152 of strip 150, enables the actuator strip 150 to be engaged by an external actuator-moving apparatus (e.g., a linear actuator, or pneumatic piston) that may, for example, be incorporated into an instrument for processing the module 100.

As shown in FIG. 2, the compression element 130 may comprise a cylinder 132 disposed within a recess 104 formed in the substrate 102. Compression element 130 may comprise other symmetric or asymmetric shapes and may be made of a relatively hard material, such as metal, plastic, or ceramic, or it may be made of a semi-solid material, such as a gel-like material. Essentially, the compression element 130 must be less compressible than the fluid chambers 110-120 it is intended to compress. In the illustrated embodiment, the recess 104 has a depth that is at least as large as the thickness of the compression element 130, e.g., as large as the diameter of roller 132, and has a width that is as at least as large as the axial length of the compression element 130. A cover element 106 may be provided to cover the recess 104, compression element 130, the fluid chambers 110-120, and a substantial portion of the actuator strip 150. Cover element 106 may be part of the module 100 or it may be part of receiving chamber (e.g., slot) an instrument configured to receive and process the module 100.

The free end 152 of the actuator strip 150 may extend through an opening 108 formed in the substrate 102 beneath the cover element 106. The second portion 154 opposite the free end 152 wraps around the roller compression element 130 (e.g., roller 132) and is secured to the actuator strip at 158 to thereby couple the actuator element 150 to the compression element 130 by essentially attaching that compression element 130 to the actuator element 150.

As the actuator element (actuator strip) 150 is pulled in the direction of arrow "A", the compression element 130 to which the actuator element 150 is attached, is dragged across the substrate 102. The cover element 106 prevents the compression element from riding over the fluid chambers 110-120, and thus the compression element 130 compresses each fluid chamber against the substrate 102 as it pass over the fluid chamber, thereby collapsing the fluid chamber and forcing fluid out of the fluid chamber. Because the actuator element 150 is able to effect movement of the compression element 130 across the substrate 102 while the actuator element 150 moves generally parallel to the plane of the substrate, the fluid chambers 110-120 can be compressed with substantially no compressing mechanisms located above or below the substrate 102 other than the actuator element itself.

Figure 3:
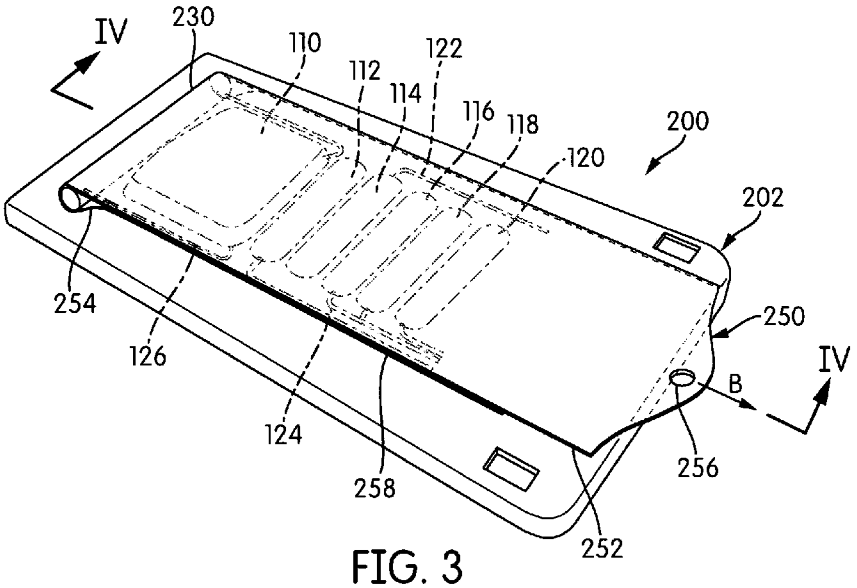
FIG. 3 is a perspective view of a module embodying aspects of the present invention according to an alternative embodiment.
Figure 4:
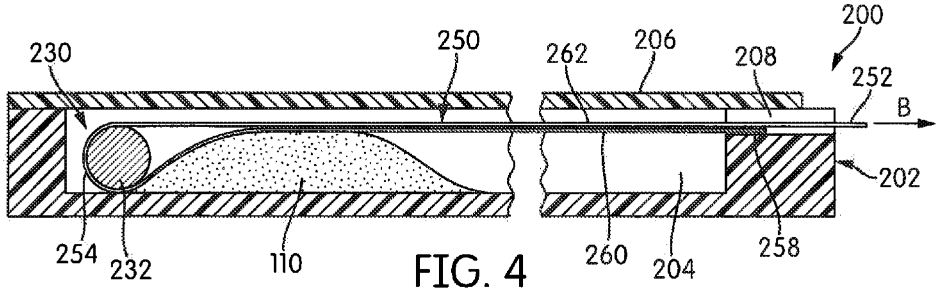
FIG. 4 is a transverse cross-section of the module shown in FIG. 3 along the line IV-IV.

An alternate embodiment of a module embodying aspects of the present invention is shown in FIGS. 3 and 4 and represented by reference number 200. FIG. 3 is a perspective view of the module 200, and FIG. 4 is a transverse cross-section of the module 200 along the line VI-VI in FIG. 3. Module 200 includes a substrate 202 on which are supported one or more fluid chambers, such as fluid chambers 110, 112, 114, 116, 118, and 120. Furthermore, as explained above, the module 200 may include one or more fluid transmission channels, such as channels 122, 124, 126.

Module 200 further includes a movable, onboard compression element 230 that is configured to be movable across the substrate 202 to thereby compress and collapse fluid chambers between the compression element 230 and the substrate 202. In the module 200, compression element 230 comprises a roller 232 configured to be rollable across the substrate 202 to thereby compress and collapse fluid chambers between the roller 232 and the substrate 202 as the roller 232 rolls across each chamber. In the illustrated embodiment, roller 232 comprises a circular, right cylinder, although other rollable configurations may be suitable as well. Compression element 230 may be made of a relatively hard material, such as metal, plastic, or ceramic, or it may be made of a semi-solid material, such as a gel-like material. Again, the compression element 230 must be less compressible than the fluid chambers 110-120 it is intended to compress.

Module 200 further includes an actuator element 250 coupled to the compression element 230 and constructed and arranged to effect rolling movement of the roller 232 across the substrate 202. In the illustrated embodiment, the actuator element comprises an actuator strip 250 that comprises a free end 252 and a fixed end 258 that is fixed to the substrate 202. As shown in FIG. 4, the roller 232 is disposed within a recess 204 formed in the substrate 202. The fixed end 258 of the actuator strip 250 is fixed to a portion of the substrate 202 adjacent the recess 204. A middle portion 254 between the fixed end 258 and the free end 252 wraps around the roller 232 to couple the roller 232 to the actuator strip 250 and defines lower and upper, substantially parallel portions 260, 262 of the actuator strip 250 that are substantially parallel to the plane of the substrate 202. The recess 204 has a depth that is at least as large as the diameter of the roller 232 and has a width that is as at least as large as the axial length of the roller 232. A cover element 206 may be provided to cover the recess 204, roller 232, the fluid chambers 110-120, and a substantial portion of the actuator strip 250. Again, the cover element 206 may be part of the module 200 or part of an instrument configured to process the module 200. The free end 252 of the actuator strip 250 extends through an opening 208 formed in the substrate 202 beneath the cover element 206.

Actuator strip 250 may be constructed of a low friction material (i.e., a low friction coefficient) so that parallel portions 260, 262, which may contact each other, easily slide past each other. Suitable materials include Mylar paper, nylon, and aluminized plastic sheet.

The actuator strip 250 may include an engagement feature 256 proximate the free end 252. Engagement feature 256, which, in the illustrated embodiment, comprises a hole formed through the free end 252 of strip 250, enables the actuator strip 250 to be engaged by an external actuator-moving apparatus (e.g., a linear actuator or pneumatic piston) that may, for example, be incorporated into an instrument for processing the module 200.

As can be appreciated from the figures, pulling the free end 252 of the actuator strip 250 in the direction of arrow "B" shown in FIGS. 3 and 4 will cause a corresponding clockwise, rolling movement of the roller 232 across the substrate 202 and over the fluid chambers. The cover element 206 prevents the compression element 230 from riding over the fluid chambers 110-120, and thus the compression element 230 compresses each fluid chamber against the substrate 202 as it pass over the fluid chamber, thereby collapsing the fluid chamber and forcing fluid out of the fluid chamber. Because the actuator element 250 is able to effect movement of the compression element 230 across the substrate 202 while the actuator element 250 moves generally parallel to the plane of the substrate, the fluid chambers 110-120 can be compressed with substantially no compressing mechanisms located above or below the substrate 202 other than the actuator element itself.

Figure 5:
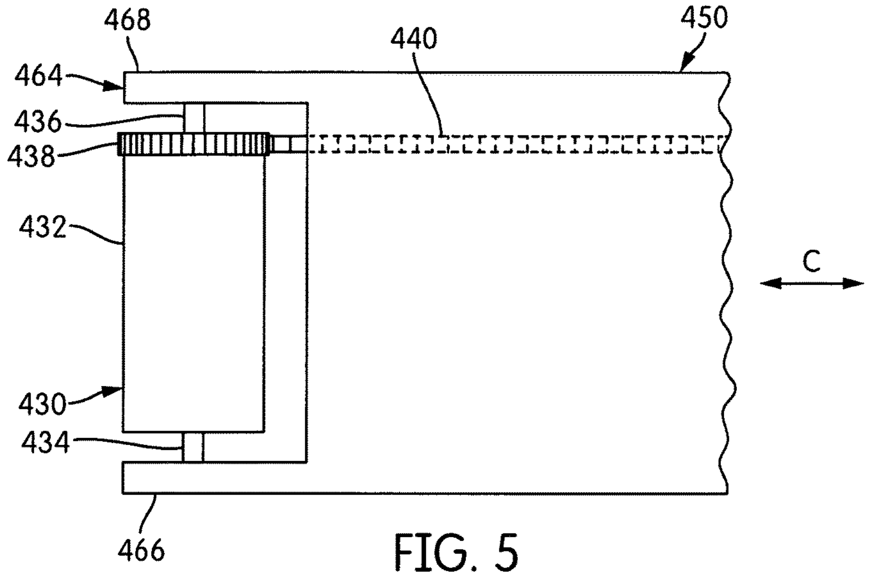
FIG. 5 is partial plan view of a movable compression element and actuator element embodying aspects of the present invention according to an alternative embodiment.

An alternative embodiment of a compression element 430 and actuator element 450 is shown in FIG. 5. In the embodiment shown in FIG. 5, the compression element 430 comprises a roller 432 (e.g., a right, circular cylindrical roller) and is coupled to the actuating element 450 supported on axles, or pivots, 434, 436 between opposed sides 466, 468 of a yoke 464 formed in an end of the actuator element 450. Axles 434, 436 may correspond to the axis of rotation of the roller 432. The substrate and fluid chamber(s) of a module incorporating the compression element 430 and actuator element 450 are not shown in FIG. 5.

As can be appreciated from the drawing, movement of the actuator element 450 in either direction indicated by arrow "C" will cause rolling movement of the roller 432. That is, the actuator element 450 can be moved in a first direction (to the right in FIG. 5) to pull the roller 432 across a substrate and one or more fluid chambers, or, if the actuator element 450 is sufficiently rigid, it can be moved in the opposite direction (to the left in FIG. 5) to push the roller element 432 across the substrate. In the illustrated embodiment, the actuator element 450 is in the form of a strip. As an alternative to the relatively wide strip 450 shown in FIG. 5—having a width corresponding to the width of the yoke 464—the yoke may be connected to a relatively slender rod, or other suitable component, that lies across the substrate of the module and can be pulled and/or pushed to effect movement of the compression element 430 across the substrate.

To ensure that the roller 432 rolls—rather than slides—over the fluid chambers, a gear 438 may be provided on portion of the roller 432, and a gear rack 440 may be formed on the substrate of the module within which the roller 432 is mounted. As the roller 432 is moved via the actuator element 450, engagement of the gear 438 with the gear rack 440 causes consistent rotation of the roller 432.

In an alternate configuration of the embodiment shown in FIG. 5, the compression element 430 is non-rotatably mounted within the yoke 464 so that movement of the actuator strip 450 (or rod) in either direction indicated by arrow "C" results in a non-rolling, sliding movement of the compression element 430 over the substrate.

Figure 6:
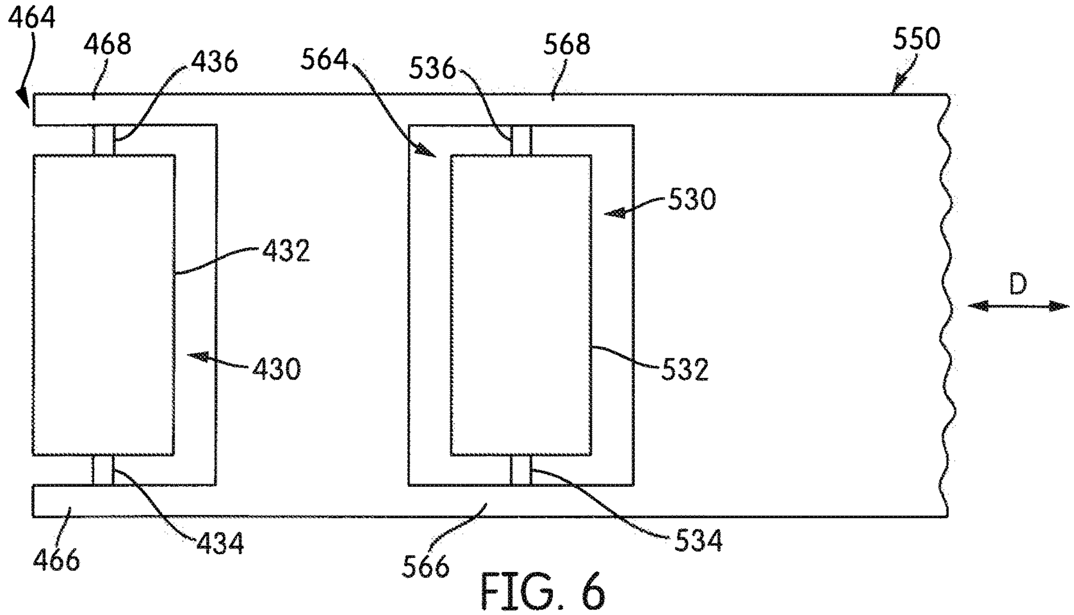
FIG. 6 is a partial plan view of an actuator element and two rolling compression elements that are movable by the actuator element in accordance with aspects of the present invention.

An alternate configuration of a compression element and associated actuator element 550 embodying aspects of the invention is shown in FIG. 6. The substrate and fluid chamber(s) of a module incorporating the compression element and actuator element of FIG. 6 are not shown in FIG. 6. In the embodiment of FIG. 6, a first compression element 430 is mounted within a yoke 464 at an end of the actuator element 550, similar to the embodiment shown in FIG. 6 and described above. The compression element 430 may be a roller 432 rotatably mounted on axels or pivots 434, 436 between opposed sides 466, 468 of the yoke 464, or the compression element 430 may be non-rotatably mounted within the yoke 464. One or more additional intermediate compression elements 530 may be mounted within one or more corresponding intermediate yokes 564. The second compression element 530 may be a roller 532, e.g. a circular right cylindrical, that is rotatably mounted on axles 534, 536 between opposed sides 566, 568 of the yoke 564. Axles 534, 536 may correspond to the axis of rotation of the roller 532. Alternatively, the second compression element 530 may be non-rotatably mounted within the yoke 564.

Pulling movement of the actuator element 550 in the right-hand direction indicated by arrow "D" will cause a corresponding pulling movement of the compression elements 430, 530. In addition, if the actuator element 550 is sufficiently rigid, pushing movement of the actuator element 550 in the left-hand direction indicated by arrow "D" will cause a corresponding movement of the compression elements 430, 530.

An integrated gear (not shown) may be provided on roller 432 and/or roller 532 which engage a gear rack (not shown) on the substrate to ensure consistent rolling motion of the roller 432 and/or roller 532 as the actuator element moves the roller(s) across the substrate, similar to gear 438 and gear rack 440 described above.

Figure 7:
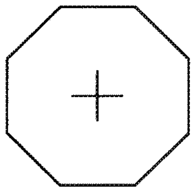
FIG. 7 is an end view of a compression element in the form of a regular polygon in accordance with an alternative embodiment.
Figure 8:
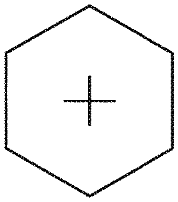
FIG. 8 is an end view of a compression element in the form of a regular polygon in accordance with an alternative embodiment.

FIGS. 7 and 8 show alternative shapes that may be employed for a rolling compression element embodying aspects of the present invention. While the rolling compression element may be in the form of a circular, right cylinder, as described above, the compression element may have the shape of a regular polygon, such as an octagon as shown in FIG. 7 or a hexagon as shown in FIG. 8 or any other regular polygon.

The embodiments described above include a single compression element and a single actuator element (e.g., actuator strip) configured to move the actuator element across the substrate and one or more fluid chambers supported on the substrate, or in the case of the embodiment shown in FIG. 6, a single actuator element 550 (e.g., actuator strip) and multiple (e.g., two) compression elements 430, 530. A module embodying aspects of the present invention may, however, comprise two or more actuator elements, each coupled to one or more associated compression elements and constructed and arranged to effect movement of the one or more associated compression elements over one or more fluid chambers of the module.

Figure 9:
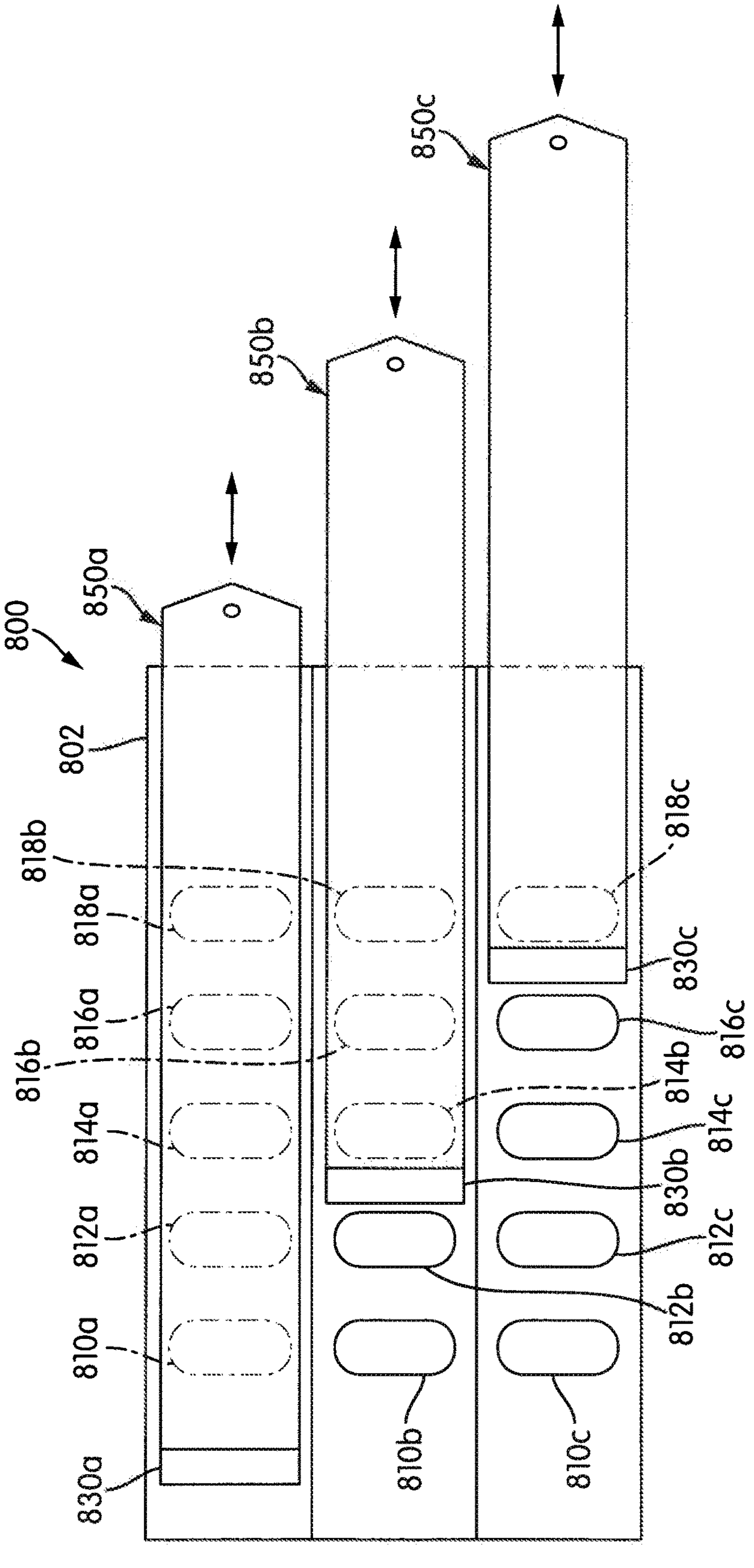
FIG. 9 is a plan view of a module embodying multiple compression elements and associated actuator elements.

Such an alternate embodiment of a module embodying aspects of the present invention is indicated by reference number 800 in FIG. 9. Module 800 includes a substrate 802 and three compression elements 830*a*, 830*b*, 830*c* (module 800 may comprises two or more compression elements), each operatively coupled with an associated actuator element (e.g., actuator strip) 850*a*, 850*b*, 850*c*. Module 800 further includes a plurality of fluid chambers 810*a*, 812*a*, 814*a*, 816*a*, 818*a*, 810*b*, 812*b*, 814*b*, 816*b*, 818*b*, 810*c*, 812*c*, 814*c*, 816*c*, and 818*c*.

Each compression element 830*a*, 830*b*, 830*c*, is configured to be moveable over one or more fluid chambers associated with that compression element. For example, in the illustrated embodiment, compression element 830*a* is configured to be moveable over fluid chambers 810*a*-818*a*, compression element 830*b* is configured to be moveable over fluid chambers 810*b*-818*b*, and compression element 830*c* is configured to be moveable over fluid chamber 810*c*-818*c*. Each compression element 830*a*, 830*b*, 830*c* and associate actuator element 850*a*, 850*b*, 850*c* may incorporate aspects of an embodiment described above. For example, the compression element may comprise right cylindrical roller having a circular or regular polygon cross-sectional shape. Alternatively, a compression element may be a non-rollable structure configured to slide over the fluid chambers. The actuator strip may comprise a continuous flexible strip that is fixed at one end to the substrate 802, wraps around a rollable compression element, and terminates at a free end that can be pulled to cause the roller to roll across the substrate. Alternatively, the actuator strip may include one or more yokes in which a rollable or non-rollable compression element is mounted as described above and shown, for example, in FIGS. 5 and 6.

The actuator strips 850*a*, 850*b*, 850*c* and the associated compression elements 830*a*, 830*b*, 830*c* may be configured to be independently moveable so that each may be moved at a different instance and/or rate so that, at any given time during the actuation of the actuator elements, each element may have progressed across the substrate 802 by a different amount, as shown in FIG. 9. Such a configuration would require a processing instrument having independently operable actuating devices configured to be coupled to and to actuate each of the actuator elements 850*a*, 850*b*, 850*c*. Alternatively, the actuator strips may be coupled to one another (e.g., comprise a single actuator strip) so that a single external actuating device may simultaneously pull all of the actuator elements and corresponding compression elements together across the substrate 802.

Figure 10:
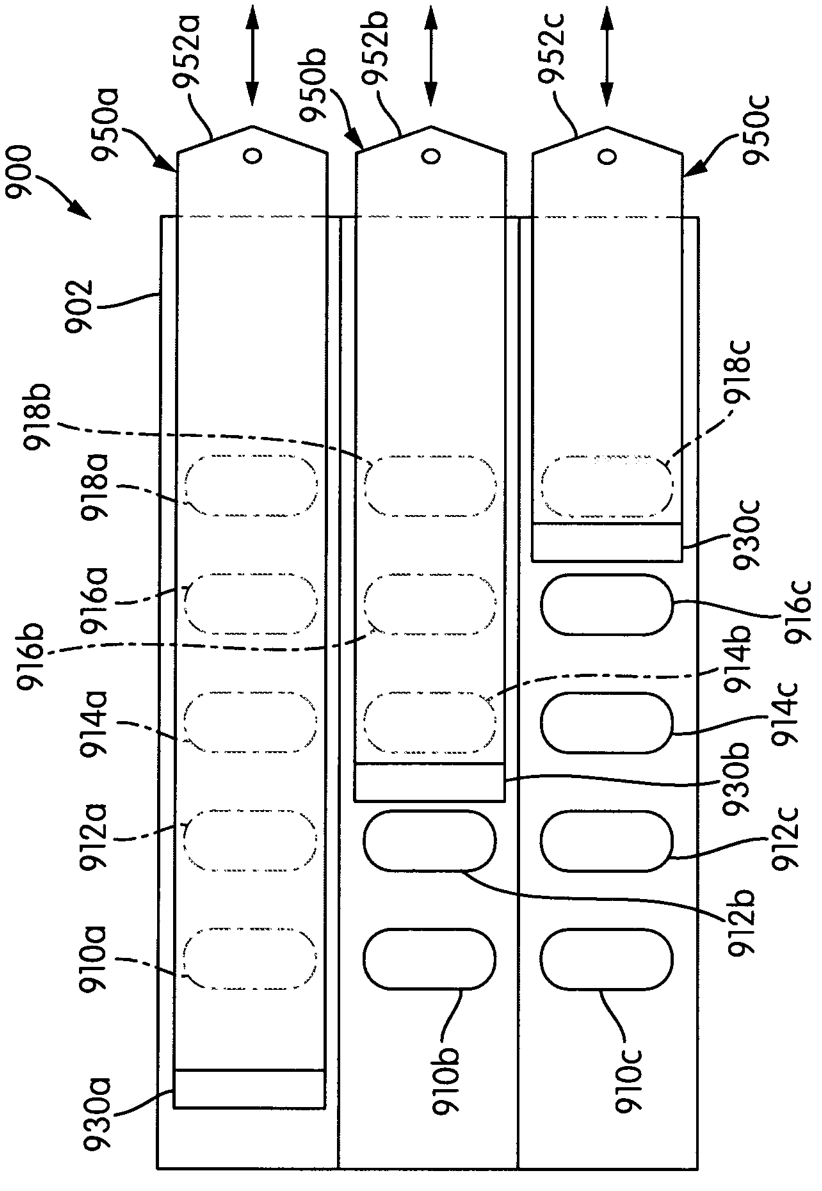
FIG. 10 is a plan view of an alternate embodiment of a module embodying multiple compression elements and associated actuator elements.

An alternate embodiment of a module including multiple actuator strips and compression elements is indicated by reference number 900 in FIG. 10. Module 900 includes a substrate 902 and three compression elements 930*a*, 930*b*, 930*c* (module 900 may comprises two or more compression elements), each operatively coupled with an associated actuator element (e.g., actuator strip) 950*a*, 950*b*, 950*c*. Module 900 further includes a plurality of fluid chambers 910*a*, 912*a*, 914*a*, 916*a*, 918*a*, 910*b*, 912*b*, 914*b*, 916*b*, 918*b*, 910*c*, 912*c*, 914*c*, 916*c*, and 918*c*.

Each compression element 930*a*, 930*b*, 930*c*, is configured to be moveable over one or more fluid chambers associated with that compression element. For example, in the illustrated embodiment, compression element 930*a* is configured to be moveable over one or more of fluid chambers 910*a*-918*a*, compression element 930*b* is configured to be moveable over one or more of fluid chambers 910*b*-918*b*, and compression element 930*c* is configured to be moveable over one or more of fluid chamber 910*c*-918*c*. Each compression element 930*a*, 930*b*, 930*c* and associated actuator element 950*a*, 950*b*, 950*c* may incorporate aspects of an embodiment described above. For example, the compression element may comprise right cylindrical roller having a circular or regular polygon cross-sectional shape. Alternatively, a compression element may be a non-rollable structure configured to slide over the fluid chambers. The actuator strip may comprise a continuous flexible strip that is fixed at one end to the substrate 902, wraps around a rollable compression element, and terminates at a free end that can be pulled to cause the roller to roll across the substrate. Alternatively, the actuator strip may include one or more yokes in which a rollable or non-rollable compression element is mounted as described above and shown, for example, in FIGS. 5 and 6.

In the embodiment illustrated in FIG. 10, the actuator strips 950*a*, 950*b*, 950*c* are of different lengths so that the free ends 952*a*, 952*b*, 952*c*, or leading ends, of the actuator strips are aligned at a common position with respect to the substrate 902. Thus, the actuator strips 950*a*, 950*b*, 950*c* can be moved simultaneously across the substrate 902 by a single mechanism engaged with the all three free ends 952*a*, 952*b*, 952*c* to compress the fluid chambers sequentially, resulting in multiple, sequential actuations of the compression elements 930*a*, 930*b*, 930*c*.

While the present invention has been described and shown in considerable detail with reference to certain illustrative embodiments, including various combinations and sub-combinations of features, those skilled in the art will readily appreciate other embodiments and variations and modifications thereof as encompassed within the scope of the present invention. Moreover, the descriptions of such embodiments, combinations, and sub-combinations is not intended to convey that the invention requires features or combinations of features other than those expressly recited in the claims. Accordingly, the present invention is deemed to include all modifications and variations encompassed within the spirit and scope of the following appended claims.

The invention claimed is:

1. A module comprising:

a substrate;

a collapsible fluid chamber supported on said substrate;

a compression element configured to collapse said fluid chamber by compressing said fluid chamber between said compression element and said substrate as said compression element moves across at least a portion of said substrate; and an actuator element constructed and arranged for movement in a plane that is substantially parallel to a plane of said substrate and coupled to said compression element such that movement of said actuator element in a plane that is substantially parallel to a plane of said substrate causes corresponding movement of said compression element across the substrate to compress said fluid chamber, wherein said actuator element comprises an actuator strip including a free end, a fixed end secured to said substrate, and a middle portion extending from said fixed end to said free end and engaging said compression element.

2. The module of claim 1, wherein the middle portion of said actuator strip extends around said compression element.

3. The module of claim 1, wherein said middle portion of said actuator strip comprises a segment of said actuator strip wrapped around said compression element.

4. The module of claim 1, wherein said actuator strip is configured such that a first portion of said strip extending between said fixed end and said compression element is parallel to a second portion of said strip extending between said compression element and said free end.

5. The module of claim 4, wherein said actuator strip is formed from a low friction material selected from the group consisting of Mylar paper, nylon, and aluminized plastic sheet.

6. The module of claim 1, wherein said compression element comprises a roller.

7. The module of claim 6, wherein said roller comprises a cylinder.

8. The module of claim 6, further comprising a gear formed on said roller and a gear rack formed on said substrate in position for operative engagement by said gear formed on said roller.

9. The module of claim 6, wherein a cross-sectional shape that is orthogonal to the rotational axis of said roller is a convex regular polygon.

10. The module of claim 1, wherein said actuator element comprises an engagement member configured to engage an external pulling means.

11. The module of claim 10, wherein said engagement member includes an opening formed through said actuator element.

12. The module of claim 1, wherein said compression element comprises a roller, and said roller is disposed within a recess formed in said substrate, said recess having a width substantially corresponding to an axial length of said roller.

13. The module of claim 1, wherein said compression element comprises a roller, and said roller is disposed within a recess formed in said substrate, said recess having a depth substantially corresponding to a width of said roller.

14. The module of claim 12, further comprising a cover element secured to said substrate and covering said recess and said compression element.

15. The module of claim 1, comprising a plurality of collapsible fluid chambers.

16. The module of claim 15, wherein at least two of the fluid chambers are interconnected by a fluid channel.

17. The module of claim 1, comprising a plurality of collapsible fluid chambers arranged such that said compression element sequentially compresses each of said chambers as said compression element moves across at least a portion of said substrate.

18. The module of claim 1, further comprising one or more fluid transmission channels connected to each collapsible fluid chamber and configured to transmit a fluid forced from said fluid chamber when said fluid chamber is collapsed.

19. The module of claim 1, comprising a plurality of compression elements configured to collapse a plurality of fluid chambers by compressing said fluid chambers between said compression elements and said substrate as said compression elements move across at least a portion of said substrate.

20. The module of claim 19, comprising at least one actuator element associated with each compression element.

21. The module of claim 19, comprising a plurality of actuator elements, each actuator element comprising a fixed end secured to said substrate, a free end, and a middle portion extending from said fixed end to said free end and engaging one of said compression elements, such that pulling the free end of each actuator strip causes one of said compression elements to move across at least a portion of said substrate and compress one or more of said fluid chambers.

22. The module of claim 20, wherein at least two of said compression elements are actuated by a single actuator element.

23. A method of motivating a fluid out of a fluid chamber, said method comprising:

(a) providing a module including at least one collapsible fluid chamber supported on a substrate, a compression element, and an actuator element constructed and arranged for movement in a plane that is substantially parallel to a plane of said substrate and coupled to said compression element such that movement of said actuator element in a plane that is substantially parallel to a plane of said substrate causes corresponding movement of said compression element across the substrate to compress said fluid chamber; and (b) moving the actuator element in a plane that is substantially parallel to a plane of said substrate to move said compression element across at least a portion of said substrate and compress the fluid chamber, thereby motivating the fluid out of the fluid chamber, wherein the actuator element comprises an actuator strip including a free end, a fixed end secured to the substrate, and a middle portion extending from the fixed end to the free end and engaging the compression element.

24. The method of claim 23, comprising the step of moving the compression element sequentially over each of a plurality of collapsible fluid chambers supported on said substrate.

25. The method of claim 23, wherein the compression element comprises a roller.

26. The method of claim 25, wherein said roller comprises a cylinder.

27. The method of claim 25, wherein a cross-sectional shape that is orthogonal to the rotational axis of said roller is a convex regular polygon.

28. The method of claim 23, wherein the middle portion of said actuator strip extends around said compression element.

29. The method of claim 23, wherein step (b) comprises compressing, sequentially or in parallel, a plurality of collapsible fluid chambers as said compression element moves across at least a portion of said substrate.

30. The method of claim 23, wherein step (b) comprises compressing, sequentially or in parallel, a plurality of collapsible fluid chambers by a plurality of compression elements as said compression elements move across at least a portion of said substrate.

31. The method of claim 30, wherein step (b) comprises pulling, sequentially or in parallel, a plurality of actuator elements, each comprising an actuator strip including a fixed end secured to said substrate, a free end, and a middle portion extending from said fixed end to said free end and engaging one of said compression elements, such that pulling the free end of each actuator strip causes one of said compression elements to move across at least a portion of said substrate and compress one or more of said fluid chambers.

32. The method of claim 23, further comprising, prior to step (b), a step of engaging said actuator element(s) to an external pulling means via an engagement member of said actuator element.

33. The method of claim 32, wherein each actuator element comprises an actuator strip and said engagement member includes an opening formed through said actuator strip(s).

* * * * *